Nov. 5, 1963  G. M. WOLFF ETAL  3,109,461
HOSE STRUCTURE
Filed Dec. 6, 1960
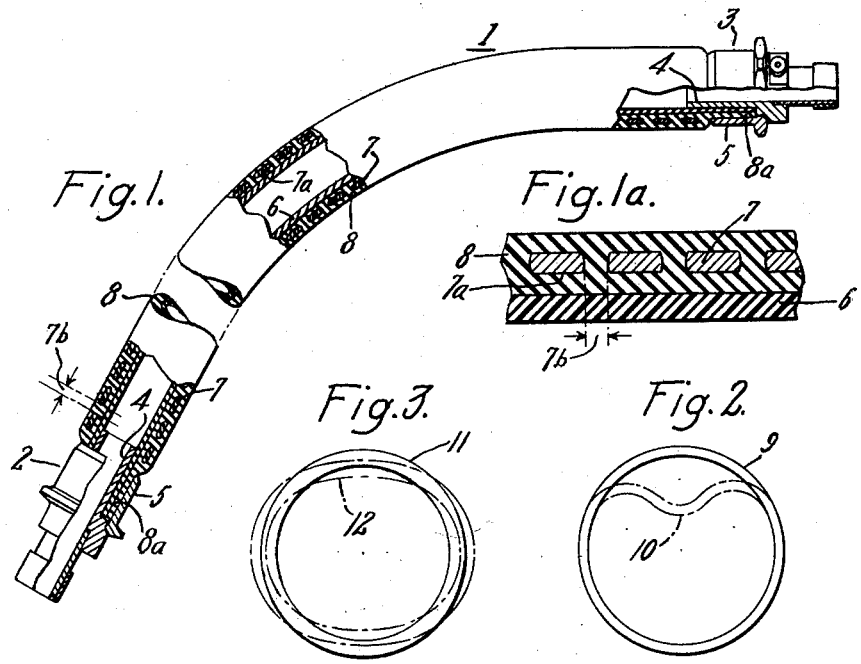
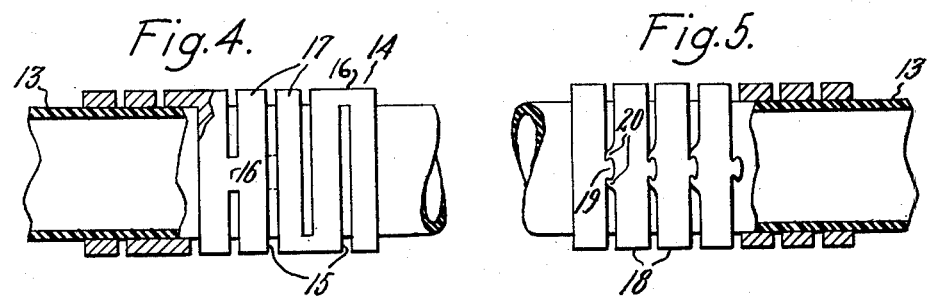
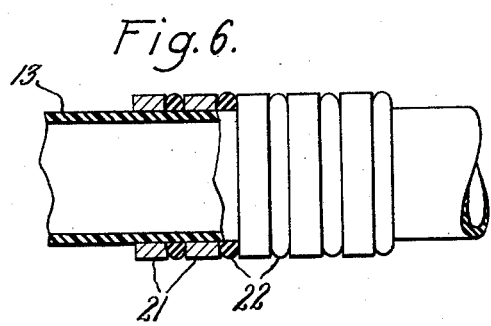
Inventors
George M. Wolff
Frank J. Lasak
by William C. Crutch
Their Attorney

United States Patent Office 3,109,461
Patented Nov. 5, 1963

3,109,461
HOSE STRUCTURE
George M. Wolff, Scotia, and Frank J. Lasak, Schenectady, N.Y., assignors to General Electric Company, a corporation of New York
Filed Dec. 6, 1960, Ser. No. 74,131
6 Claims. (Cl. 138—137)

This invention relates to a hose structure for conveying a fluid, especially constructed to resist collapse from an external pressure higher than that of the fluid. More particularly the invention relates to a flexible, heat-resistant, collapse-resistant, insulating hose assembly particularly suited for conducting liquid coolant to the stator bars of a gas-filled dynamoelectric machine.

Normally hoses are designed from a standpoint of burst strength, that is, the resistance to failure due to the internal pressure of the fluid being conducted in the hose. Occasionally, however, a hose must carry its fluid while disposed in a medium having a pressure higher than the fluid being carried. Such a condition exists in a hose conducting liquid coolant for cooling the conductors in a large dynamoelectric machine, while the hose is disposed in a casing filled with a gas, such as hydrogen, at a pressure as high as 45 p.s.i.g. or more. Under such conditions, the hose must be designed primarily against collapse of its walls which would block the hose and cause serious damage by cutting off the flow of liquid coolant to the windings.

On the other hand, burst strength of the hose must also be considered, since the hose will, at times, be required to carry liquid with no pressure in the generator casing, and pump malfunctions might cause the internal hose pressure to be quite high. Many other considerations also enter into the design of the hose to be subjected to the rigors of the particular application mentioned. The hose must be a high voltage insulator, thus excluding a metallic hose which might have more resistance to collapse from external pressures. The hose must be flexible to compensate for thermal expansion and contraction of the stator bars, thus excluding both metallic and nonmetallic materials of high rigidity. The hose must be resistant to oil or water for a long time under temperature conditions on the order of 40° to 100° C. And lastly, the hose material must be as dense or impermeable as possible to reduce the diffusion of gas through the hose into the liquid coolant.

Accordingly, it is a primary object of the present invention to provide an insulated flexible hose for carrying fluid under pressure when subjected to an external pressure higher than that of the fluid.

Another object of the invention is to provide a hose assembly which is flexible, yet which resists collapse due to external pressure.

A further object is to provide a hose assembly suitable for conducting liquids at relatively high temperatures for long periods of time inside a gas-filled dynamoelectric machine.

Still another object is to provide an insulated hose assembly for connecting to a high voltage stator bar of a rating of at least 10,000 volts for the purpose of conducting a liquid coolant thereto.

Another object is to provide an improved hose construction which has both a high burst strength and a high resistance to collapse, while at the same time being flexible.

Generally stated, the invention is practiced by providing a hose assembly with an inner tube of flexible material which has a wall thickness thin enough to provide suitable flexibility yet thick enough to insure "thick wall collapse," whereby the inner tube will tend to take an elliptical shape as the external pressure is increased. The inner tube is surrounded by a plurality of rigid rings which resist a tendency of the inner tube to take this elliptical shape, the tubes being spaced from one another so as not to impair flexibility of the inner tube. The rigid rings are flexibly spaced, preferably in a molded casing with the rings embedded in it, to provide protection for the hose assembly and to prevent contamination of the external surface thus lowering its electrical resistance.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a view, partly in section, of the preferred embodiment of the hose assembly shown together with end fittings;

FIG. 1a is an enlarged cross-sectional view of one wall of the hose shown in FIG. 1;

FIG. 2 is a cross-section through a typical thin-walled flexible tube illustrating one type of collapse;

FIG. 3 is a cross-section through a tube having a thicker wall than that of FIG. 2, and illustrating a second type of collapse; and FIGS. 4, 5 and 6 illustrate modified forms of the invention.

Referring now to FIGS. 1 and 1a of the drawing, a curved length of hose assembly shown generally at 1 has end fittings 2, 3 with inner serrated tubes 4 and outer serrated rings 5 which are spaced to receive the ends of hose 1. The hose assembly 1 comprises a flexible inner tube 6 and a plurality of rigid support rings 7 embedded in an outer tube 8.

Inner tube 6 is of a flexible insulating material having good long-time resistance to oil or water or other suitable liquid coolants at temperatures on the order of 80° C. The presently best-known material for inner tube 6 is polytetrafluoroethylene which is a thermoplastic, substantially chemically inert material, having all of the aforementioned qualities. A suitable commercially available material for inner tube 6 is "Teflon No. 6," manufactured by E. I. du Pont de Nemours & Company.

The wall thickness of inner tube 6 is selected with the greatest care, lying between maximum and minimum limits, the limits depending upon the conditions under which the hose will operate. Polytetrafluoroethylene, being thermoplastic, has properties which are a function of temperature, hence the wall thickness is selected with due regard to the temperature at which the hose is expected to operate, here on the order of 40° to 100° C. The maximum wall thickness of tube 6 is that which will permit flexibility of the hose assembly due to thermal expansion and contraction of the stator bars to which the hose is attached, without causing undue stresses or failure in hose 1. The maximum thickness must also be selected with due regard to the desired hose diameter, since at least a minimum size opening is required to conduct the liquid coolant, yet if the hose diameter is too large, it will greatly increase its cost and cause crowding in the dynamoelectric machine end turn region where space is at a premium. It is considered that a maximum wall thickness of a Teflon tube which would provide the flexibility desired in service would be on the order of 0.20 inch for a tube having an outside diameter on the order of one inch.

The minimum wall thickness of inner tube 6 is also selected with great care in order to successfully practice the invention. FIGS. 2 and 3 illustrate respectively failure conditions referred to hereinafter as "thin wall collapse" and "thick wall collapse." FIG. 2 is a cross-section of a tube 9 of flexible material subjected to an external pressure greater than its internal pressure. Tube 9 has a relatively thin wall and the type of collapse that takes place is illustrated by the dotted lines 10. It can be seen that this portion of the tube "caves in." If external pressure continues, the collapse will completely close off the interior of tube 9. It is to be particularly noted that thin wall collapse takes place with no increase in diameter of the tube.

FIG. 3 illustrates a tube 11 of an identical material to that of tube 9, but having a thicker wall. As illustrated by the dotted lines 12, an increase in external pressure beyond a given point will cause the tube to commence to deform in an elliptical pattern. As is clearly seen, this "thick wall collapse" takes place with an increase in diameter over that of the original tube 11 i.e. along the major axis of the ellipse, as shown by dotted lines 12.

It has been found that the transition from "thin wall collapse" to "thick wall collapse" takes place fairly abruptly as the wall thickness is increased. Although the theoretical analysis is complicated, the point at which this transition occurs can be readily determined by simple experimentation with tubes of various wall thickness under the pressure and temperature conditions at which the tube is intended to operate. Such experimentation will indicate the minimum wall thickness at which the thick wall type of collapse illustrated by FIG. 3 may be reasonably expected to take place. This minimum thickness using a polytetrafluoroethylene tube under the conditions described and having an outside diameter on the order of one inch has been found to be on the order of 0.090 inch.

In order to provide economy of material, it is preferable to stay closer to the minimum wall thickness than the maximum wall thickness, and we have found that a good wall thickness for an inner tube 6 having an outside diameter of 1 1/16 inches is on the order of .150 inch.

The rings 7 surrounding inner tube 6 are, as opposed to the flexibility of tube 6, selected from a rigid material which will resist deformation from its circular shape. Rings 7 are also preferably selected from heat-resistant, insulating material and are of roughly rectangular cross-section with the long side 7a of the rectangle disposed parallel with the sides of tube 6. Rings 7 are spaced from one another as indicated by spacing distance 7b which one another as indicated by spacing distance 7b which may be on the order of haf the length of side 7a.

Rings 7 are selected from rigid materials resisting deformation and, in the preferred embodiment shown, consist of woven glass fibers reinforced with epoxy resin. Many equivalents will occur to those skilled in the art, and rings 7 could be made of either glass or asbestos fiber, woven and impregnated with suitable resins such as melamine, epoxy, polyester, or silicones. Rings 7 are not necessarily made from resin reinforced fiber, since they might also consist of ceramic or other rigid insulating materials. Separate rings are preferable to a continuous helix, in order that they will have high resistance to diametrical enlargement. It is known that a helix when subjected to internal radial force tends to enlarge, this being permitted by a shortening of the helix.

Rings 7 are preferably embedded in a molded casing of flexible insulating material such as "Buna N" rubber, although other suitable synthetic rubber materials such as butyl, silicone, or neoprene rubbers may be used. The outer rubber casing 8 acts primarily as a means for flexibly spacing rings 7 on the inner tube 6 so that the rigid rings remain separated by the spacing 7b, yet so that the flexibility of hose assembly 1 is not significantly affected. The moldable rubber casing 8 also acts inside rings 7 to prevent abrasion of rings 7 on inner tube 6 and acts outside of rings 7 to prevent collection of contamination between the rings.

In the vicinity of fittings 2, 3, casing 8 continues without rings 7 in a reduced diameter portion 8a and together with the end of the inner tube 6 is tightly secured between members 4 and 5.

It will be appreciated that casing 8 adds somewhat both to the burst strength and the collapse resistance of hose assembly 1, although this is not essential since inner tube 6 is designed to have sufficient natural strength when coupled with the rings 7 to resist both bursting and collapse. Casing 8 also aids in reducing the diffusion of the gas coolant into the liquid coolant, since "Buna N" rubber is highly impervious to such gaseous diffusion.

FIG. 4 illustrates a modified form of the invention wherein an inner tube 13 is disposed within an outer assembly 14, the latter of which performs the combined function of both rings 7 and flexible casing 8 in FIG. 1. Tube 13 is selected to have a minimum wall thickness so as to insure "thick wall collapse," as illustrated in FIG. 3, and a maximum thickness to insure flexibility under the desired operating conditions. The outer assembly 14 comprises a tube of rigid material which has been provided with a plurality of spaced cuts 15 which extend almost all the way through the tube with the exception of the uncut portions 16. Between cuts 15 are defined rigid rings 17. The unbroken portions 16 are of small enough cross-section to provide flexibility, while serving to space the rings 17 from one another axially. Rings 17, since they form a complete circle, resist deformation in substantially the same manner as rings 7 in FIG. 1.

FIG. 5 illustrates a second modification with a tube 13 answering the description of the tube 13 in FIG. 4. Here, however, rigid rings 18 are provided with male and female universal connections 19, 20, respectively, which can be of many suitable types. Fittings 19, 20 serve to flexibly space rings 18 on tube 13.

A third modification of the invention is seen in FIG. 6, wherein a tube 13 answering the description of that in FIGS. 4 and 5 is surrounded by spaced rigid rings 21 and flexible washers 22. Rings 21 answer the description of rings 7 in FIG. 1. Washers 22 may be of a shape similar to an O-ring and are composed of rubber or other flexible material. It can be seen that the operation of the modification shown in FIG. 6 is in many ways similar to that of FIG. 1, with the exception that there is no protective layer of rubber both inside and outside of the rigid rings.

The operation of the improved hose assembly is as follows. Under normal operating conditions, i.e. an external gas pressure in the generator stator higher than that of the coolant liquid inside the hose, a net external pressure tends to collapse the hose. Since the inner tube 6 has been selected to have a wall thickness such that it will always exhibit a tendency to undergo "thick wall collapse" as shown in FIG. 3 rather than "thin wall collapse" as shown in FIG. 2, the diameter of inner tube 6 will tend to become greater along the major axis of the ellipse. The rigid rings 7, however, resist this tendency towards an enlargement of the diameter of inner tube 6, thus supporting the inner tube against collapse. The rings 7, of course, also aid in increasing the burst strength of hose 1, in the case of a reversal of pressure so that a higher pressure exists in the hose than outside the hose.

Although the rings 7 are rigid and resist deformation through the hose cross-section, the fact that they are flexibly spaced from one another by the flexible casing 8 insures that they do not prevent hose assembly 1 from being flexible. In other words, the casing 8 allows the rigid rings relatively freely to come closer to one another on the inside of the bend and to spread apart from one another on the outside of the bend without affecting the ability of each individual ring to support the inner tube against thick wall collapse. Thus the outer casing 8 serves as a means to flexibly space the rigid rings axially along the inner tube 6. This function of the outer casing 8 is performed in the modifications of the invention disclosed in FIGS. 4, 5, and 6 by the connecting portions 16, in FIG. 4, the connectors 19, 20 in FIG. 5, and the O-ring washers 22 in FIG. 6.

It should also be noted that the rings 17 are preferably of rectangular cross-section with the long side of the rectangle parallel with the inner tube, so as to provide as large a support surface as possible. The thickness of the rigid ring 7 is no greater than necessary to provide rigidity to resist its deformation into an elliptical shape.

The hose assembly described results in an improved arrangement having adequate flexibility between ends of the hose, insulation to high voltage between the ends of the hose, high burst resistance, high resistance to collapse due to external pressure, and ability to conduct liquids at temperatures up to 130° C.

What we claim as new and desire to secure by Letters Patent of the United States is:

1. A flexible collapse-resistant hose comprising a flexible inner tube comprised substantially of polytetrafluoroethylene having relative proportions on the order of an outside diameter of one inch and a wall thickness greater than 0.09 inch and not greater than 0.20 inch, whereby the tube is relatively flexible transversely and will exhibit a tendency to increase in transverse dimension in at least one direction when subjected to external pressure exceeding its internal pressure, a plurality of rigid ring members disposed around said inner tube to resist substantial deformation along their diameters and reinforce the inner tube against said increase in transverse dimension, and means flexibly spacing said rigid ring members axially along the inner tube, whereby the hose is substantially free to bend.

2. A collapse-resistant flexible hose in accordance with claim 1 in which the rigid ring members and spacing means comprise an outer tube of substantially rigid material disposed around said inner tube, said outer tube defining spaced transverse slots passing through the major portions of the outer tube and leaving ring portions connected by uncut portions, said ring portions having sufficient rigidity to resist substantial deformation along their diameters, said uncut portions being disposed at different circumferential locations along the length of the inner tube, whereby the uncut portions serve to space the ring portions while allowing the hose to bend.

3. A collapse-resistant flexible hose in accordance with claim 1 in which each of the rigid ring members has male and female universal connections attaching to adjacent ring members, whereby the hose is substantially free to bend.

4. A collapse-resistant flexible hose in accordance with claim 1 in which the ring spacing means comprises flexible washers disposed around the inner tube and interposed between said rigid ring members, whereby the hose is substantially free to bend.

5. A flexible collapse-resistant hose comprising a flexible inner tube having a wall thickness tending to effect thick wall collapse when subjected to external pressure, an outer flexible casing disposed closely about said inner tube, and a plurality of longitudinally spaced rigid ring members embedded in said outer casing to resist deformation along their diameters and thereby reinforce the inner tube against thick wall collapse.

6. A flexible insulating collapse-resistant hose comprising a flexible inner tube comprised substantially of polytetrafluoroethylene having relative proportions on the order of an outside diameter of one inch and a wall thickness on the order of .150 inch, whereby the inner tube is flexible yet will exhibit a tendency to assume an elliptical cross-section when subjected to external pressure, an outer casing comprised of synthetic rubber disposed about said inner tube, and a plurality of rigid ring members of inorganic fibers impregnated with a binding resin, said rings having a rectangular cross-section with the greatest dimension of the rectangle lying parallel to the inner tube to provide support, said ring members being embedded in the outer casing and resisting any tendency of the inner tube to increase in transverse dimension.

References Cited in the file of this patent

UNITED STATES PATENTS

| | | |
|---|---|---|
| 2,364,332 | Wilkinson | Dec. 5, 1944 |
| 2,531,700 | Porter | Nov. 28, 1950 |
| 2,690,769 | Brown | Oct. 5, 1954 |
| 2,748,803 | Guarnaschelli | June 5, 1956 |
| 2,787,289 | Press | Apr. 2, 1957 |
| 2,800,145 | Prierls et al. | July 23, 1957 |
| 2,810,424 | Swartswelter et al. | Oct. 22, 1957 |
| 2,888,042 | St. John et al. | May 26, 1959 |
| 2,898,940 | Cole | Aug. 11, 1959 |
| 2,932,065 | Jenkins | Apr. 12, 1960 |

FOREIGN PATENTS

| | | |
|---|---|---|
| 792,388 | France | Oct. 21, 1935 |
| 887,495 | France | Apr. 16, 1943 |